Aug. 14, 1945.　　　　E. C. YOUNG　　　　2,382,932
WELDING ROD CONTAINER
Filed March 1, 1943　　　　2 Sheets-Sheet 1
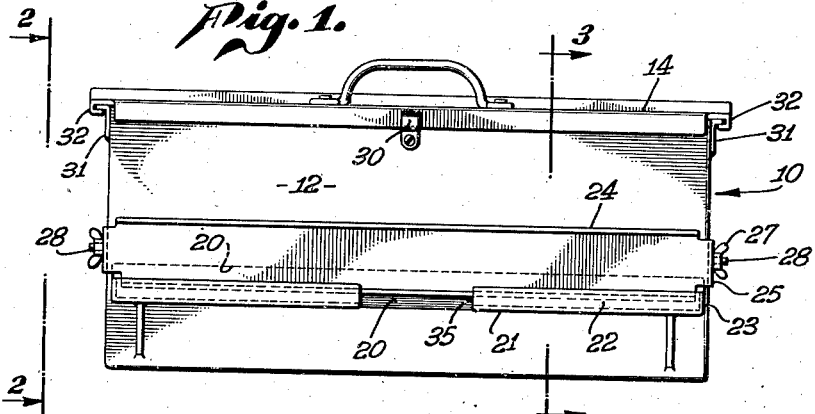
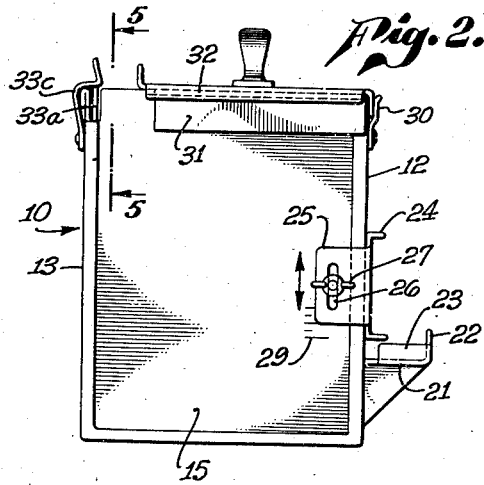
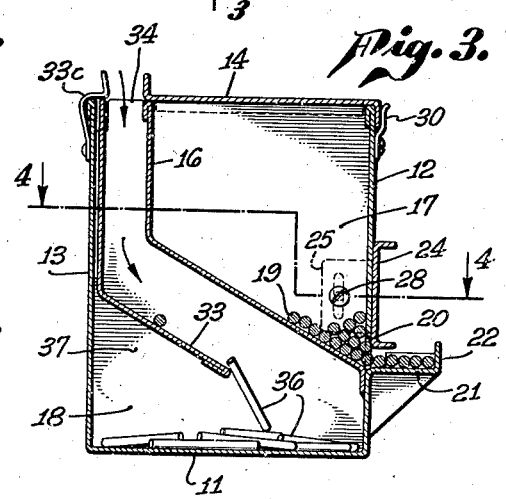
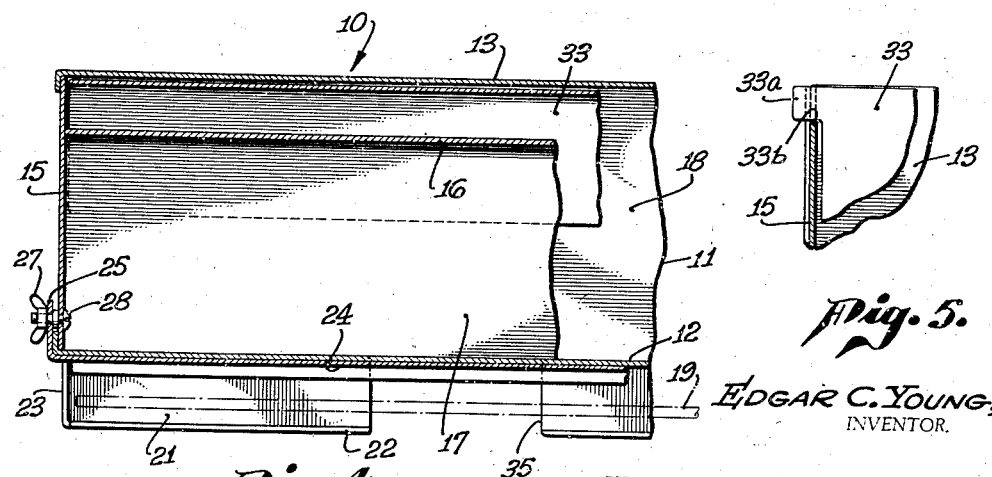
EDGAR C. YOUNG, INVENTOR.
BY
ATTORNEY.

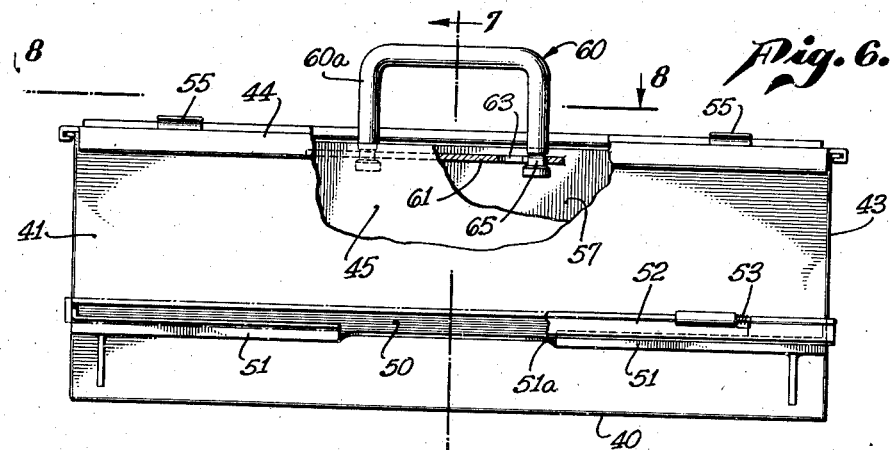
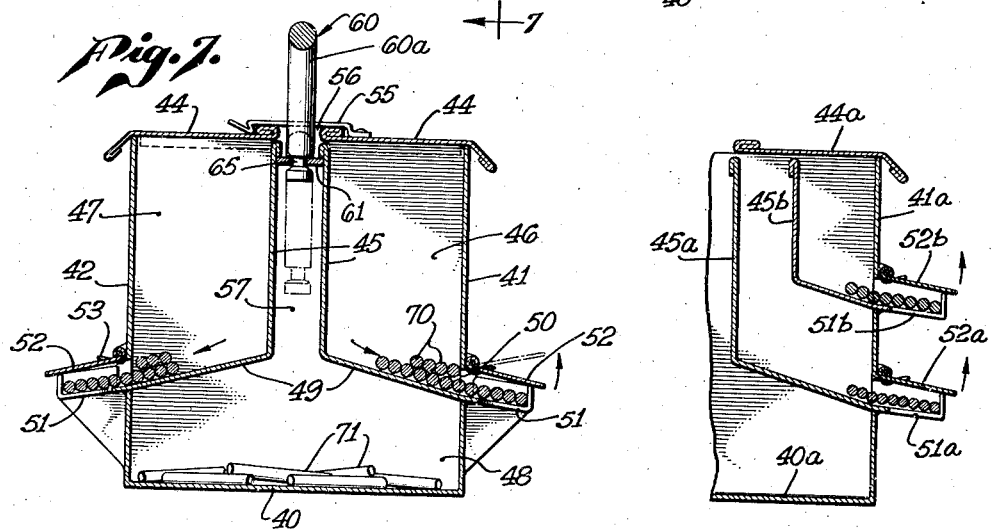
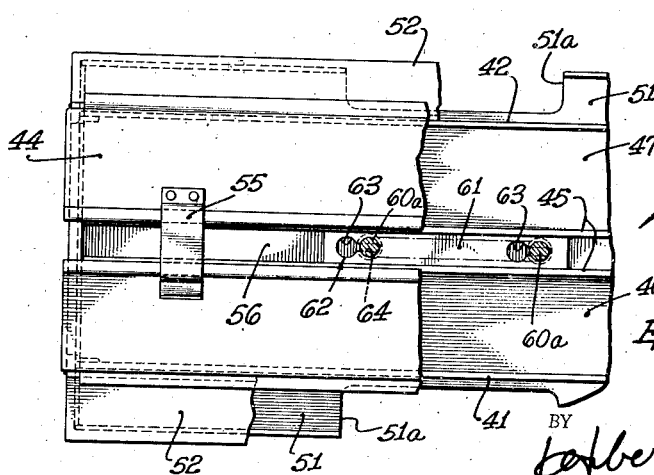

Patented Aug. 14, 1945

2,382,932

UNITED STATES PATENT OFFICE 2,382,932

WELDING ROD CONTAINER

Edgar C. Young, Long Beach, Calif., assignor of one-fourth to Irving Hertz, one-fourth to Nathan Nagel, both of Long Beach, Calif., and one-fourth to Herbert A. Huebner, Los Angeles, Calif.

Application March 1, 1943, Serial No. 477,613

5 Claims. (Cl. 206—16)

My invention relates to a welding rod container.

It is a primary object of my invention to provide a welding rod container in which the welding rods are enclosed to prevent them from spilling out if the container is knocked over, and to protect the rods (particularly the coating of flux) against damage or deterioration due to moisture.

A more particular object of the invention is to provide a welding rod container in the general form of a tool box with a handle, and structurally designed so that a limited supply of welding rods is exposed for use at any given time, the bulk of the rods being retained inside of the box, and automatically fed out as the rods are removed from the exposed portion for use.

A further object of the invention is to provide in a welding rod container of the character described a compartment for stubs or short ends whereby these may be salvaged for reforming into rods.

These and other objects of my invention will become more apparent from a further consideration of the specification and drawings.

In the drawings:

Figure 1 is a front elevation of my welding rod container.

Figure 2 is an end view of the same taken on the line 2—2 of Figure 1.

Figure 3 is a vertical cross-section of the same taken on the line 3—3 of Figure 1.

Figure 4 is a horizontal sectional view taken longitudinally of the container and on the line 4—4 of Figure 3.

Figure 5 is a fragmentary sectional view taken on the line 5—5 of Figure 2.

Figure 6 is a front elevation of a modified form of my invention.

Figure 7 is a vertical cross-section of the same taken on the line 7—7 of Figure 6.

Figure 8 is a fragmentary top plan view with parts broken away as indicated by the line 8—8 of Figure 6.

Figure 9 is a fragmentary vertical section illustrating a further modification.

Referring to Figures 1 to 5, my container 10 is of rectangular box-like form having a bottom 11, a front 12, a back 13, and a cover 14, as well as ends 15. The device is preferably made of sheet metal although other materials may be employed. The box is divided by a longitudinal partition 16 into two compartments, a welding rod compartment 17 and a compartment 18 for stubs. The partition 16 preferably extends vertically downward for a portion of the distance and is inclined at the lower portion to cause welding rods 19 to roll by gravity toward a slot 20 in the front 12 of the box. Adjacent the slot 20 a shelf 21 extends outwardly from the front on a substantially horizontal plane, being formed with a longitudinal lip 22 and ends 23 to confine the welding rods reposing on the shelf 21. The effective depth of the slot 20 (to accommodate different size welding rods) may be regulated by adjusting a plate 24 provided with ears 25 having slots 26 and being adjustably secured upon the ends 15 by wing nuts 27 on screws 28. A scale 29 may be marked on the end of the box adjacent one of the ears 25 for reference in adjusting the depth of the slot 20. The cover 14 is removably secured in place by a spring clip 30, although the clip may be dispensed with if the friction mounting of the cover as next described is sufficiently tight. This friction mounting comprises angle members 31 welded or otherwise attached to the ends of the box, adapted for engagement with inturned flanges 32 on the ends of the cover. It is desirable, though not essential, to provide a guide 33 on the interior of the stub compartment 18 substantially paralleling the partition 16. This guide may be formed with ears 33a resting in notches 33b in the ends 15, and retained by a spring clip 33c. The cover 14 is left open at 34 for the reception of stubs, which are diverted inwardly by the inclined portion of the guide 33.

In use the cover is removed and a supply of welding rods are inserted in the compartment 17, whereupon the cover is replaced. It is assumed that the plate 24 has been adjusted to provide the correct depth of the slot 20 for the size welding rods in use. These rods are normally coated with flux increasing the original diameter thereof and this of course is considered. A limited number of rods roll by gravity through the slot and come to rest upon the shelf 21. They may be removed therefrom by inserting the thumb and finger in a central notch 35. As the outermost rod is withdrawn the other rods on the shelf are rolled outwardly by the weight of the rods on the inclined portion of the partition 16 and another rod comes out through the slot 20. The weight of the rods in the compartment 17 is normally sufficient to pack the rods on the shelf 21 tightly enough that they will not fall out even if the container should be tipped.

After rods are used, the stubs or short ends are dropped through the opening 34 into the compartment 18 where they are collected until the workman returns to the stock room for an additional supply of new rods at which time it is customary to deposit the stubs in a suitable receptacle. The inclined portion of the guide 33 tends to divert the stubs 36 into the inverted V-shaped section indicated by the numeral 37 in case the container is overturned. In emptying the compartment 18 of stubs it is desirable that the partition 33 be removed which is readily accomplished by releasing the spring clip 38, and sliding the partition out.

In the modified form of my invention shown in Figures 6 to 8, the container comprises a bottom 40, sides 41 and 42, ends 43, and cover members 44. Partitions 45 divide the box into two welding rod compartments 46 and 47 and a compartment 48 for short ends or stubs. In this form of the invention the partitions 45 extend vertically and parallel from the cover downwardly and terminate in outwardly diverging inclined sections 49, which extend outwardly through slots 50 and provide shelves 51 functioning similar to the shelf 21 of the previously described form. I may provide hinged covers 52 over the shelves 51, which covers are urged to closing position by a spring 53.

The two cover sections 44 may be frictionally mounted from opposite directions by means similar to those described previously, and may be retained in closed position by a spring clip or clips 55, when closed being nevertheless spaced as illustrated to provide an opening 56 for the reception of stubs, which opening communicates with a passage 57 formed between the vertical sections of the partitions 45.

It is desirable to mount the handle 60 in a manner enabling it to be shifted in so that the boxes may be stacked flat one on top of the other. This mounting may be accomplished by securing a bracket 61 centrally in the passage 57, employing slots 62 having a circular portion 63 large enough to receive an arm of the handle 60, and a reduced portion 64 which will accommodate only a reduced portion 65 on the arms of the handle. Thus in use the handle may be slid so that the reduced portion 65 fits in the reduced portions of the slots 62; and when it is desired that the handle be put out of the way it is slid so that the arms 60a of the handle 60 will pass downwardly through the enlarged portions 63 of the slots 62, then reposing in the position indicated by broken lines in Figure 7.

In the use of this form of the invention, the feeding of new welding rods 70 is substantially the same as described in reference to the previous form. A notch 51a in the shelves facilitates removal of the rods. Stubs 71 are collected by inserting them through the opening 56. When the welder returns to the stock room the stubs are collected by inverting the container, and the inclined sections 49 of partitions 45 thereupon perform in the general manner of a funnel and direct the stubs 71 down through the passage 57.

The further modification illustrated in Figure 9 utilizes two generally similar partitions 45a and 45b on each side of the box, terminating in shelves 51a and 51b, one above the other to increase the capacity of the container for holding rods of different sizes. Thus while the form shown in Figure 7 will hold welding rods of two different sizes, that shown in Figure 9 will hold rods of four different sizes.

The form of invention illustrated in Figures 1 to 5 is principally intended for use in airplane factories and other places where a single size welding rod is normally used by any welder and also where moisture in the air is not seriously encountered. The forms shown in Figures 6 to 9 is preferred in shipyards and under other working conditions where one welder may be required to use a plurality of different sized rods, and also where moisture tends to attack the flux coating on the rod and deteriorate or damage it. These suggestions for use are by way of example and not by way of limitation, the primary principle in both types being the same.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Having described my invention, what I claim as new and desire to secure by Letters Patent is:

1. A welding rod container comprising a substantially closed box with a slot in one wall suitable for a welding rod to roll through, the box having a compartment the bottom of which is a partition sloping down toward the slot whereby welding rods placed in the compartment will feed by gravity through the slot, and having a second compartment for the reception of welding rod stubs, said second compartment having an inlet opening at the top of the box and a portion extending below said first compartment.

2. A welding rod container comprising a substantially closed box having a longitudinal partition with a lower portion sloping to a vertical wall of the box and forming with the walls, top, bottom and ends of the box a rod compartment and a stub compartment, a slot through said wall adjacent the junction of partition and wall in the rod compartment through which welding rods may feed by gravity, and an opening at the top of the box communicating with the stub compartment for the reception of welding rod stubs.

3. A device as described in claim 2 in which there is a shelf extending out from said wall adjacent said slot adapted to contain rods fed through said slot.

4. A device as described in claim 2 in which there is a shelf extending out from said wall adjacent said slot adapted to contain rods fed through said slot, and a hinged cover over said shelf.

5. A welding rod container comprising a substantially closed box with a slot in one wall suitable for a welding rod to roll through, the box having a compartment the bottom of which is a partition sloping down toward the slot whereby welding rods placed in the compartment will feed by gravity through the slot, and a shelf extending out from said wall adjacent said slot adapted to contain rods fed through said slot, said slot having a depth slightly less than the combined diameters of two welding rods so that a single layer only of said rods is supplied to said shelf, said shelf having a central notch to facilitate removal of rods therefrom, and a plate adjustably mounted on the said wall for varying the effective depth of the slot.

EDGAR C. YOUNG.